Patented May 5, 1953

2,637,680

UNITED STATES PATENT OFFICE 2,637,680

METHOD FOR THE EXTRACTION OF INSULIN AS WELL AS ENZYMES FROM PANCREAS

Gustav Petersen, Roskilde, Denmark, assignor to Danske Andelsslagteriers Konservesfabrik A. m. b. A., Roskilde, Denmark No Drawing. Application February 24, 1948, Serial No. 10,573. In Denmark March 31, 1943

Section 1, Public Law 690, August 8, 1946
Patent expires March 31, 1963

3 Claims. (Cl. 167—75)

According to the method usually employed for the preparation of insulin, pancreas is treated with acid alcohol whereby insulin is dissolved. The concentration of the alcohol employed is usually 60–80 per cent by weight, and as the glands contain water a further considerable dilution of the alcohol will take place. Through this treatment some of the enzymes present will, however, be destroyed. Lipases and amylases are practically completely destroyed, while with regard to trypsin and other protein-digesting enzymes part of the enzymes will be dissolved together with the insulin so that a subsequent separation will involve great difficulties and part of the enzymes will be inactivated. The compound remaining after extraction will only contain a very slight amount of protein-digesting enzymes and practically no lipases or amylases.

By means of an initial extraction with weak acid instead of alcohol lipases and amylases are likewise destroyed while trypsin is inactivated to a certain extent, and some of the insulin is dissolved together with the trypsin. If the glands are extracted with water or if they are dried, the trypsin will destroy the insulin.

It has, however, now been shown that it is possible to gain all the fat-, carbohydrate- and protein-digesting enzymes present in pancreas and also the insulin by extracting the insulin according to the present invention from fresh or frozen pancreas by means of alcohol the pH of which is between 6 and 7.3 and the concentration of which is adjusted in such a way that after dilution with the quantity of water present in the glands the concentration of the mixture (liquid phase) will be between 70 and 80 per cent (by weight) and the pH of the mixture as stated above. Such an alcohol will not dissolve the enzymes while it will dissolve insulin. It is now possible according to known methods to extract fat-, carbohydrate- and protein-digesting enzymes or enzyme preparations from the residue which is free from insulin. It has proved convenient when working according to the present invention to allow the action of the solvent to take place at a temperature below 10° C.

Example 1

50 kg. frozen pancreas, which have been subjected to freezing immediately after the slaughtering of the animals, and which have a water content of about 60 per cent and a pH of 6.7 are shredded, the thickness of the flakes being less than 0.1 mm., and treated for two hours, stirring or shaking well all the time, with 150 kg. of ethylalcohol, the concentration of which is 93.85 per cent by weight, in such a manner that the temperature is kept at 5° C. When the alcohol which has now obtained a concentration of about 78 per cent by weight has been removed by filtration or centrifuging, the glands are again thoroughly mixed with ethylalcohol, this time using 50 liters of 79 per cent by weight. The treatment lasts about two hours. The alcohol is removed by filtration, pressing or centrifuging and is mixed with the extract from the first treatment. The extract is worked up into solid insulin in the usual manner, and the yield of insulin obtained proves by standardization on 38 rabbits to correspond to about 1800 international units per kg. of gland. The alcohol is removed from the residue by drying in vacuum and it is de-fatted by means of trichloroethylene. The enzyme content of the residue will correspond to:

About 30,000,000 full Gross trypsin units,
About 3,000 lipase units (Willstätter) and
About 8,000 amylase units (Willstätter) per kg. of gland employed.

This preparation may be used directly as an enzyme preparation for various purposes, but may also be used for the preparation of pure enzymes by extraction according to known methods.

Example 2

80 kg. frozen hog pancreas with a water content of about 60 per cent and a content of fat of about 20 per cent and a pH of 5.8 is shredded and treated with 160 liters of ethylalcohol the concentration of which is 93.85 per cent by weight for about two hours, stirring or shaking well all the time, and simultaneously adding 250 g. of sodium hydroxide. After standing the pH of the resulting mixture will be 7.0 and the concentration of the alcohol will be about 73 per cent. It should be noticed that the amount of sodium hydroxide used is dependent on the buffer action of the glands, the buffer action varying for different glands. When the alcohol has been removed by filtration or centrifuging the glands are again treated with alcohol, this time with 80 liters of a concentration of 79 per cent by weight. The alcohol extracts are worked up into insulin in the known manner, while enzymes are gained from the residue which is now free from insulin. The yield will be about 8 g. insulin the strength of which is about 21.000 international units per g. corresponding to a yield of 2100 units per kg. pancreas. The enzymes obtained correspond to about 30 million full Gross trypsin units, determined according to A. Pedersen's and Bo's casein method, and about 700,000 trypsin units, determined according to the gelatine method devised by the same authors, all calculated per kg. pancreas. Lipases and amylases are further obtained.

Having now described my invention, what I claim as new and desire to secure by Letters Patent is:

1. Method for the extraction of insulin as well as enzymes from pancreas, which comprises first extracting the insulin from fresh pancreas by means of alcohol at a pH between 6 and 7.0, the concentration and quantity of alcohol employed being such that the percentage of alcohol in the mixture produced when the amount of water contained in the glands is added will be between about 70 and 80 per cent by weight, and thereafter extracting the enzymes from the insulin-free residue.

2. Method according to claim 1 which comprises extracting the insulin at a temperature below 10° C.

3. Method according to claim 1 comprising the step of adding an alkaline substance during the extraction, resulting in a pH of the mixture of pancreas and alcohol of 6 to 7.0

GUSTAV PETERSEN.

References Cited in the file of this patent

UNITED STATES PATENTS

| Number | Name | Date |
|---|---|---|
| 412,836 | Carnrick | Oct. 15, 1889 |
| 2,353,016 | Daughenbaugh | July 4, 1944 |
| 2,571,126 | Frederiksen | Oct. 6, 1951 |

FOREIGN PATENTS

| Number | Country | Date |
|---|---|---|
| 65,995 | Denmark | Dec. 8, 1947 |
| 445,131 | Belgium | April 1942 |
| 566,351 | Great Britain | Dec. 27, 1944 |

OTHER REFERENCES

Office of the Publication Board Report, Number PB-981. "Pharmaceutical Activities at the I. G. Farbenindustrie Plant," Hochst am Main, July 1945 on microfilm, pages 48 to 61.

Novo in Manufacturing Chemist, January 1949, volume 20, pages 10 to 15, page 15 only relied on.

Mitchell, "Textbook of Biochemistry," 1946, page 220.